United States Patent

Terado et al.

[11] Patent Number: 5,914,381
[45] Date of Patent: Jun. 22, 1999

[54] DEGRADABLE POLYMER AND PREPARATION PROCESS OF THE SAME

[75] Inventors: Yuji Terado; Hiroshi Suizu; Chojiro Higuchi; Masanobu Ajioka, all of Kanagawa-ken, Japan

[73] Assignee: Mitsui Chemicals, Inc., Tokyo, Japan

[21] Appl. No.: 08/925,133

[22] Filed: Sep. 8, 1997

[30] Foreign Application Priority Data

Sep. 12, 1996 [JP] Japan .................................. 8-242047
Mar. 11, 1997 [JP] Japan .................................. 9-056653
Mar. 27, 1997 [JP] Japan .................................. 9-074871

[51] Int. Cl.$^6$ .............................. C08J 63/08; C08B 3/00; C08B 13/00; C08G 63/664
[52] U.S. Cl. ...................... 527/300; 527/311; 527/315; 525/54.2; 525/54.21; 525/54.24; 525/54.3; 525/54.31
[58] Field of Search .................................. 527/300, 311, 527/325; 525/54.2, 54.21, 54.24, 54.3, 54.31

[56] References Cited

U.S. PATENT DOCUMENTS

| | | |
|---|---|---|
| 3,806,473 | 4/1974 | Lombardi et al. . |
| 5,210,108 | 5/1993 | Spinu et al. .............................. 521/182 |
| 5,401,796 | 3/1995 | Kashima et al. ......................... 524/706 |
| 5,412,067 | 5/1995 | Shinoda et al. .......................... 528/361 |
| 5,637,631 | 6/1997 | Kitada et al. .............................. 524/81 |
| 5,714,230 | 2/1998 | Kameoka et al. ....................... 428/141 |

FOREIGN PATENT DOCUMENTS

| | | |
|---|---|---|
| 618249 | 10/1994 | European Pat. Off. . |
| 4440858 | 5/1996 | Germany . |
| 6-287279 | 10/1994 | Japan . |
| 1408142 | 10/1975 | United Kingdom . |
| 2145422 | 3/1985 | United Kingdom . |

*Primary Examiner*—Nathan M. Nutter
*Attorney, Agent, or Firm*—Burns, Doane, Swecker & Mathis, L.L.P.

[57] ABSTRACT

A degradable polymer and a process for preparing the degradable polymer which has a structure resulting from combination of a star-shaped polymer comprising a polyfunctional base compound of polycarboxylic acid having three or more carboxyl groups and/or anhydride of the same or aliphatic polyhydric alcohol having three or more hydroxyl groups and a unit of aliphatic hydroxycarboxylic acid, with aliphatic polyhydric alcohol having two or more hydroxyl groups or polycarboxylic acid having two or more carboxyl groups or anhydrides of the same. The degradable polymer leads to remarkably low coloration as compared with a polymer comprising polysaccharide as a polyfunctional base compound, has high melt tension as compared to common aliphatic polyester is excellent in processability on various molding methods, foam molding and blow molding in particular, and high transparency.

18 Claims, No Drawings

DEGRADABLE POLYMER AND PREPARATION PROCESS OF THE SAME

BACKGROUND OF THE INVENTION

1. Field of the Invention

The present invention relates to a degradable polymer having resulting from the combination of a star-shaped polymer which is obtained by carrying out dehydration condensation of hydroxycarboxylic acid with polycarboxylic acid or anhydride thereof having three and more carboxyl groups or aliphatic polyhydric alcohol having three and more hydroxyl groups as a base compound, with aliphatic polyhydric alcohol having two and more hydroxyl groups or polycarboxylic acid or anhydride thereof having two and more carboxyl groups. The present invention also relates to a process for preparing the degradable polymer.

The degradable polymer of the invention has a high melt tension while maintaining an equivalent or higher transparency compared with aliphatic polyesters prepared by conventional techniques, for example, aliphatic polyester obtained by polycondensation of aliphatic polycarboxylic acid and polyhydric alcohol and aliphatic polyester obtained by polycondensation of aliphatic hydroxycarboxylic acid. The degradable polymer of the invention exhibits excellent processing ability such as in blow molding, foaming, inflation molding and other various processing methods.

Further, the degradable polymer of the invention is characterized by less discoloration compared to a copolymer prepared from polysaccharide as a polyfunctional base compound and aliphatic polyester, for example, aliphatic polyester obtained by polycondensation of aliphatic polycarboxylic acid with aliphatic polyhydric alcohol and aliphatic polyester obtained by polycondensation of hydroxycarboxylic acid.

The degradable polymer of the invention can be processed by utilizing the favorable properties into various molded article and work pieces, and is useful as a substitute of medical materials and general purpose resins.

2. Description of the Related Art

In recent years, waste disposal has become a problem in connection with environment protection. Specifically, molded articles and work pieces of general purpose polymer materials lead to problems in land fills, because they are lacking in ability to degrade or disintegrate by the action of microorganisms and semipermanently remain in soil as extraneous matter. They also cause elution of plasticizers and other additives and contaminate the environment. Further, in the case of incinerating these matters as refuse, the damage of the incinerator due to a great quantity of heat generated by combustion and numerous ill effects of discharged smoke and exhaust gas on the atmospheric pollution, ozone layer destruction, warming of the earth's atmosphere and acid rain have been noted.

In view of this situation, a polymer material having excellent degradability and toughness at the same time has been strongly desired. Nevertheless, the polymer material which can conform to such demand has not yet been supplied.

Conventionally, polyhydroxycarboxylic acid and polysaccharide have a characteristic of hydrolyzing with ease in the presence of water. When these polymers are used for a general purpose resin, they degrade without contaminating the environment after waste disposal, so they are friendly to the environment. When these polymers are left in a living body as a medical material, they are degraded and absorbed in the living body without giving toxicity to the living body after attaining the object, so they are thus friendly to the living body. These excellent properties have already received attention.

For example, polylactic acid and cellulose acetate have a characteristic of hydrolyzing with ease in the presence of water. In the case of using these polymers as a general purpose resin, these polymers are easy on the environment because of degradation without contamination of the environment after waste disposal. In the case of leaving the polymers in a living body as a medical material, these polymers do not give an adverse effect on the living body, can be decomposed and absorbed in the living body without poisoning after attaining the object, and thus have a characteristic of being easy on the living body.

However, in the case of processing into molded articles or work pieces such as a film and filament, polylactic acid is excellent in transparency and simultaneously has problems of brittleness, high hardness, lack of flexibility and low melt tension. Cellulose acetate can be used for a cigarette filter and photographic base film, where it has suffered the disadvantage of requiring an extraordinarily great amount of plasticizer.

In view of the foregoing technical background, techniques have been developed in order to overcome these problems. One technique is to radially add high molecular weight degradable polymers as side chains to a polyfunctional base compound by ring-opening polymerization of lactide, that is, a cyclic dimer of lactic acid and cyclic monomers such as lactones, for example, $\epsilon$-caprolactone.

For example, BP 2,145,422 has disclosed a technique on a polymer obtained by adding polylactic acid or polyhydroxycarboxylic acid as a side chain to hydroxyl group of polyhydric alcohol such as sugar or sugar alcohol. More specifically, the disclosed technique relates to an ester of polyhydric alcohol which involves ester bonds formed by hydroxyl groups of polyhydric alcohol and carboxyl groups of polylactic acid or copolylactic acid. That is, the disclosed technique relates to the polymer which is obtained by esterifying polyhydric alcohol such as glucose or a derivative thereof having a molecular weight of 20,000 or less with polylactic acid or a derivative thereof or with copolylactic acid or a derivative thereof having a molecular weight of 5,000 or more.

The ester of polyhydric alcohol has a relatively low molecular weight and is suitable for being applied to a slow release medicine and other DDS.

U.S. Pat. No. 5,210,108 has disclosed a technique relating to a rigid resin foam of a star-shaped polymer which is obtained by using a polyfunctional base compound having 3–100 amino or hydroxyl groups and 5–10,000 carbon atoms and by radially adding two or more high molecular weight arms (side chains) to the polyfunctional base compound.

The high molecular weight degradable side chain is a segment compound of polyhydroxycarboxylic acid such as polylactic acid, polyglycolide or polycaprolactone, and has a specific structure that the portion close to the polyfunctional base compound is composed of an amorphous segment and the portion remote from the polyfunctional base compound is composed of a semi crystalline segment.

Further, Japanese Laid-Open Patent HEI 6-287279 has disclosed a preparation process of a lactide-based graft copolymer obtained by reacting cellulose ester or cellulose ether with lactide.

That is, the technique is characterized by carrying out ring opening graft copolymerization of lactide with cellulose ester or cellulose ether in the presence of an esterification catalyst and can provide a preparation process of a lactide-based graft copolymer which is excellent in transparency, degradability, thermoplastic property and laminating ability. The above mentioned prior techniques are ring opening polymerization methods and these ring-opening polymerization methods require conventionally many process steps compared with direct dehydration condensation and the cyclic dimer is also expensive. Further, the technique has suffered problems of tendency to coloration in the step of adding the degradable high polymer side chain to polysaccharide, the polyfunctional base compound.

In such a technique for providing the polyfunctional base compound with a degradable high molecular weight side chain by ring opening polymerization of a cyclic monomer such as lactide and lactones or direct dehydration condensation of a hydroxycarboxylic acid such as lactic acid in place of lactide or lactones, when the amount of the polyfunctional base compound is increased, the equivalent ratio of the hydroxyl group or amino group to the carbonyl group or carboxyl group deviates from 1 in the reaction and thus it is generally difficult to obtain a degradable polymer having a high molecular weight sufficient to exhibit high melt tension. The trend is increased in particular, when the polyfunctional base compound is low molecular compound.

The present inventors have already disclosed in U.S. Pat. No. 5,310,865 a technique for preparing a high molecular weight aliphatic polyhydroxycarboxylic acid in high purity and a technique for preparing a film, filament and molded article which comprise said polyhydroxycarboxylic acid and have excellent strength by directly carrying out dehydration condensation of aliphatic hydroxycarboxylic acid without using a cyclic monomer.

The adoption of the technique disclosed in U.S. Pat. No. 5,310,865 has for the first time enabled one to obtain a high molecular weight aliphatic polyhydroxycarboxylic acid by directly carrying out dehydration condensation of the intact aliphatic hydroxycarboxylic acid such as lactic acid and other non-cyclic monomers and not by way of the cyclic dimers of the same.

One object of the invention is to obtain a degradable polymer having properties described below by further developing the technical concept disclosed in U.S. Pat. No. 5,310,865.

1) Much less coloration as compared with copolymers obtained by using polysaccharide as a polyfunctional center compound.
2) High melt tension as compared with common aliphatic polyester.
3) Excellent in foaming property and other processing properties as compared with common aliphatic polyester.
4) Equivalent or higher transparency as compared with common aliphatic polyester.

SUMMARY OF THE INVENTION

As a result of an intensive investigation in order to solve the above subjects, the present inventors have found that a degradable polymer having a structure resulting from combination of a star-shaped polymer which results from dehydration condensation of hydroxycarboxylic acid by using polycarboxylic acid or anhydride thereof having three and more carboxylic groups or aliphatic polyhydric alcohol having three and more hydroxyl groups as a base compound, with aliphatic polyhydric alcohol having two and more hydroxyl groups or polycarboxylic acid or anhydride thereof having two and more carboxylic groups, can achieve the above objects. Thus the present invention has been completed.

That is, aspects of the invention include a preparation process of a degradable polymer and the degradable polymer obtained by the preparation process comprising conducting a dehydration condensation reaction in the presence of a catalyst on a component (A): hydroxycarboxylic acid, a component (B): one or more compound selected from the group consisting of:

(b-1) polycarboxylic acid having three or more carboxyl groups, (b-2) anhydride of polycarboxylic acid having three or more carboxyl groups, and (b-3) aliphatic polyhydric alcohol having three or more hydroxyl groups, and a component (C): one or more compound which can conduct an esterification reaction with the component (B) and is selected from the group consisting of:

(c-1) polycarboxylic acid having two or more carboxyl groups, (c-2) anhydride of polycarboxylic acid having two or more carboxyl groups, and (c-3) aliphatic polyhydric alcohol having two or more hydroxyl groups.

Another aspect of the invention is a preparation process of a degradable polymer comprising conducting a reaction, in the presence of a catalyst, on a cyclic dimer and/or lactone of aliphatic hydroxycarboxylic acid, an aliphatic polyhydric alcohol having three or more hydroxyl groups and a polycarboxylic acid having two or more carboxyl groups and/or acid anhydride of the same.

A further aspect of the invention is a degradable polymer having a structure resulting from combination of a star-shaped polymer comprising polycarboxylic acid or anhydride thereof having three or more carboxyl groups as the polyfunctional base compound and aliphatic hydroxycarboxylic acid as a unit, with aliphatic polyhydric alcohol having two or more hydroxyl groups.

A still further aspect of the invention is a degradable polymer having a structure resulting from combination of a star-shaped polymer comprising aliphatic polyhydric alcohol having three or more hydroxyl groups as the polyfunctional base compound and aliphatic hydroxycarboxylic acid as a unit, with polycarboxylic acid or anhydride thereof having two or carboxyl groups.

DETAILED DESCRIPTION OF THE PREFERRED EMBODIMENTS

According to the preparation process of the invention, a degradable high molecular weight polymer can be obtained by dehydration condensation of, for example, lactic acid, butane-1,2,3,4-tetracarboxylic acid and 1,4-butanediol in an organic solvent in the presence of a catalyst. The degradable polymer has a high melt tension in addition to excellent toughness and transparency which are essential properties of polylactic acid, and is suited for providing processed products such as foams and formed articles by blow molding.

The present invention will hereinafter be illustrated in detail. When references and the cited scope of the references are clearly indicated in the present specification, all description in the references are regarded, unless otherwise noted as a part of the disclosure in the specification and shall be an item or disclosure which can be directly introduced without misunderstanding by those skilled in the art on the basis of the item or disclosure and the cited scope of reference which are described in the specification.

The aliphatic hydroxycarboxylic acid which can be used as the component (A) in the invention is an aliphatic carboxylic acid having a hydroxyl group in the molecule and no particular limitation is imposed upon the acid. Specific hydroxycarboxylic acids which are suited for the invention include, for example, lactic acid, glycolic acid, 3-hydroxybutyric acid, 4-hydroxybutyric acid, 4-hydroxyvaleric acid, 5-hydroxyvaleric acid and 6-hydroxycaproic acid. Lactic acid is preferably used in view of transparency of the resulting degradable polymer. These hydroxycarboxylic acids can be used singly or as a mixture. When two or more hydroxycarboxylic acids are used in combination, a combination of lactic acid with other aliphatic hydroxycarboxylic acid is preferred in view of transparency of the degradable polymer obtained.

When an asymmetric carbon is present in the molecule like lactic acid, any of the D-isomer, L-isomer and an equal amount mixture of these isomers (racemic isomer) can be used for the invention. L-Lactic acid is preferred in particular.

Cyclic dimers and lactones of the above hydroxycarboxylic acids can be used in place of aliphatic hydroxycarboxylic acid of component (A) in combination with component (B); (b-3) aliphatic polyhydric alcohol having three or more hydroxyl groups. Specific examples of cyclic dimers and lactones of aliphatic hydroxycarboxylic acid which can be suitably used in the invention include lactide, that is, a cyclic dimer of lactic acid, glycolide, that is, a cyclic dimer of glycolic acid, β-propiolactone, γ-butyrolactone, δ-valerolactone and ε-caprolactone. Lactide is preferred in view of transparency of the degradable polymer obtained. The cyclic dimers and lactones of aliphatic hydroxycarboxylic acid can be used singly or as a mixture. When using two or more cyclic dimers and lactones of aliphatic hydroxycarboxylic acid in combination, a combination of lactide with other cyclic dimers or lactones of aliphatic hydroxycarboxylic acid is preferably used in view of transparency of the resulting degradable polymer.

When an asymmetric carbon is present in the molecule like lactide, any of the D-isomer, L-isomer, and meso-isomer can be used. L-lactide is preferably used in particular.

No particular limitation is put on invention by component (B), (b-1) polycarboxylic acid having three or more carboxyl groups and (b-2) acid anhydride of polycarboxylic acid having three or more carboxylic groups. Both linear compounds and cyclic compounds are included. Linear compounds are generally preferred because of a high molecular weight, high melt tension, low brittleness, and readiness to obtain a degradable polymer having these excellent properties.

Specific cyclic compounds which can be used in the invention include, for example, 1,2,3,4,5,6-cyclohexanehexacarboxylic acid, 1,2,3,4-cyclopentanetetracarboxylic acid, tetrahydrofuran-2R, 3T, 4T, 5C-tetracarboxylic acid, 1,2,3,4-cyclobutanetetracarboxylic acid, 4-carboxy-1,1-cyclohexanediacetic acid, 1,3,5-cyclohexanetricarboxylic acid, 1,3,5-trimethyl-1,3,5-cyclohexanetricarboxylic acid, (1α, 3α, 5β)-1,3,5-trimethyl-1,3,5-cyclohexanetricarboxylic acid and other alicyclic polycarboxylic acids; 2,3,4,5-furantetracarboxylic acid, 2-methyl-3,4,6-pyridinetricarboxylic acid and other heterocyclic polycarboxylic acid; trimellitic acid, pyromellitic acid and other aromatic polycarboxylic acids; and acid anhydrides of these cyclic compounds. These cyclic compounds can be used singly or as a mixture.

When an asymmetric carbon is present in the molecule, any of D-isomer, L-isomer, and an equal amount mixture of these isomers (racemic isomer) can be used.

Representative linear compounds which can be used in the invention include, for example, butane-1,2,3,4-tetracarboxylic acid, meso-butane-, 1,2,3,4-tetracarboxylic acid, 1,3,5-pentanetricarboxylic acid, 2-methylpropanetricarboxylic acid, 1,2,3-propanetricarboxylic acid, 1,1,2-ethanetricarboxylic acid, 1,2,4-butanetricarboxylic acid and other aliphatic polycarboxylic acids; and acid anhydrides of these linear polycarboxylic acids. These linear polycarboxylic acids can be used singly or as a mixture. Butane-1,2,3,4-tetracarboxylic acid, mesobutane-1,2,3,4-tetracarboxylic acid and acid anhydride of these carboxylic acids are preferred in particular.

When an asymmetric carbon is present in the molecule any of the D-isomer, L-isomer and an equal amount mixture of these isomers (racemic isomer) can be used.

Component (B), (b-2) acid anhydride of polycarboxylic acid having three or more carboxyl groups can be a compound having an anhydride bond in the molecule or a cyclic or linear compound obtained by forming an anhydride bond between molecules. The acid anhydride having an anhydride bond between molecules can be a dimer, oligomer or polymer. Further, a copolymerized linear condensate of two or more aliphatic polycarboxylic acids having three or more carboxyl groups can also be used.

The term "linear" has a concept opposite to "small ring" and not opposite to "branch". Consequently, the concept of the term "linear" is absolutely not a "small ring" and includes straight line, large ring, branch, star-shape, three dimensional network, IPN and other structures having one or more dimensions.

Representative compounds of (B); (b-3) aliphatic polyhydric alcohol which has three or more hydroxyl groups and can be used for the invention include for example, glycerol, pentaerythritol, dipentaerythritol, trimethylolethane, trimethylolpropane and inositol. These polyhydric alcohols can be used singly or as a mixture. And in these compound, pentaerythritol is preferred. When pentaerythritol is used, the degradable polymer obtained is difficult to color and has generally YI of 3 or less.

When an asymmetric carbon is present in the molecule, any of the D-isomer, L-isomer and an equal amount mixture thereof (racemic isomer) can be used.

Component (C), (C-1) polycarboxylic acid having two or more carboxyl groups and (C-2) acid anhydride of polycarboxylic acid having two or more carboxyl groups which are used in the invention, have no restriction in particular and include linear compounds and cyclic compounds.

Aliphatic dicarboxylic acid, aromatic dicarboxylic acid and acid anhydride of the same are more preferably used in view of ease availability of the raw-material and polymerization procedure.

Component (C), (C-2) acid anhydride of polycarboxylic acid having two or more carboxyl groups can have an acid anhydride bond in the molecule or can be a cyclic or linear molecule having an acid anhydride bond between molecules. A dimer or higher oligomer and polymer can also be included when the acid anhydride bond is present between molecules.

Specific cyclic compounds which can be used in the invention include, for example, cyclohexanedicarboxylic acid and other alicyclic dicarboxylic acids; terephthalic acid, 1,4-phenylenediacetic acid, phenylsuccinic acid, 2,6-naphthalenedicarboxylic acid and other aromatic dicarboxylic acids; 1,2,3,4,5,6-cyclohexanehexacarboxylic acid, 1,2,3,4-cyclopentanetetracarboxylic acid, tetrahydrofuran-2R, 3T, 4T, 5C-tetracarboxylic acid, 1,2,3,4-cyclobutanetetracarboxylic acid, 4-carboxy- 1,1-cyclohexanediacetic acid, 1,3,5-cyclohexanetricarboxylic acid, 1,3,5-trimethyl-1,3,5-cyclohexanetricarboxylic acid, (1α, 3α, 5β)-1,3,5-trimethyl-1,3,5-cyclohexanetricarboxylic acid and other alicyclic polycarboxylic acids having three or more carboxyl groups; 2,3,4,5-furantetracarboxylic acid, 2-methyl-3,4,6-pyridinetricarboxylic acid and other heterocyclic polycarboxylic acids having three or more carboxyl groups; trimellitic acid, pyromellitic acid and other aromatic polycarboxylic acid having three or more carboxyl groups; and acid anhydrides of these polycarboxylic acids. These polycarboxylic acids can be used singly or as a mixture.

Specific linear compounds which can be used in the invention include, for example, succinic acid, oxalic acid, malonic acid, glutaric acid, adipic acid, pimelic acid, suberic acid, azelaic acid, sebacic acid, undecanoic diacid and dodecanoic diacid, 3,3-dimethylpentane diacid and other aliphatic dicarboxylic acids; butane- 1,2,3,4-tetracarboxylic acid, meso-butane-1,2,3,4-tetracarboxylic acid, 1,3,5-pentanetricarboxylic acid, 2-methylpropanetricarboxylic acid, 1,2,3-propanetricarboxylic acid, 1,1,2-ethanetricarboxylic acid, 1,2,4-butanetricarboxylic acid and other aliphatic polycarboxylic acid having three or more carboxyl groups; and acid anhydrides of these polycarboxylic acids. These polycarboxylic acids can be used singly or as a mixture.

When an asymmetric carbon is present in the molecule, any of the D-isomer, L-isomer and an equal amount mixture of those isomers (racemic isomer) can be used.

Specific compounds of component (C), (C-3) aliphatic polyhydric alcohol which has two or more hydroxyl groups and can be used for the invention include, for example, ethylene glycol, diethylene glycol, triethylene glycol, propylene glycol, dipropylene glycol, 1,3-butanediol, 1,4-butanediol, 3-methyl-1,5-pentanediol, 1,6-hexanediol, 1,7-heptanediol, 1,8-octanediol, 1,9-nonanediol, neopentyl glycol, 1,4-cyclohexanedimethanol, glycerol, pentaerythritol, dipentaerythritol, trimethylolethane, trimethylolpropane and inositol. These polyhydric alcohols can be used singly or as a mixture. When an asymmetric carbon is present in the molecule, any of the D-isomer, L-isomer and an equal amount mixture of these isomers (racemic isomer) can be used.

As to the amounts of component (A) and component (B) for use in the invention, the amount of component (B) is in the range of 0.005–10% by weight, preferably 0.01–5% by weight for the theoretical amount of polymer resulting from complete homopolymerization of component (A).

When the amount of component (B) is less than 0.005% by weight, melt tension of resulting degradable polymer becomes insufficient. On the other hand, the amount of component (B) exceeding 10% by weight tends to cause gelation of resulting degradable polymer.

As to the amounts of component (A) and component (B) in the case of using a cyclic dimer or lactone in place of aliphatic hydroxycarboxylic acid of component (A), the amount of component (B) is in the range of 0.005–1% by weight, preferably 0.01–0.5% by weight for the theoretical amount of polymer resulting from complete homopolymerization of the cyclic dimer or lactone. When the amount of component (B) is less than 0.005% by weight, melt tension of the resulting degradable polymer becomes insufficient. On the other hand, the amount exceeding 1% by weight reduces attainable molecular weight of the resulting polymer due to the effect of by-product water accompanied by the reaction and the degradable polymer having practical strength becomes difficult to obtain. As a reaction method in such case, the attainable molecular weight can be increased by previously conducting ring-opening polymerization and successively carrying out the dehydration condensation method described in the invention in order to further progress the dehydration condensation reaction. However, the method requires complex procedures and is not an effective countermeasure.

The equivalent ratio of the hydroxyl group to carboxyl group in component (B) and component (C) is 100:50–200, preferably 100:80–120, more preferably 100:90–110. When the equivalent ratio in component (B) and component (C) is outside of the above range, melt tension of the resulting degradable polymer becomes insufficient, or the molecular weight of the polymer does not increase and the degradable polymer having practical strength becomes difficult to obtain.

Representative catalysts which can be used in the invention are metals of the group II, III, IV and V in the periodic table and oxides or salts of these metals, and include for example, zinc powder, tin powder, aluminum, magnesium and other metals; stannous oxide, antimony oxide, zinc oxide, aluminum oxide, magnesium oxide, titanium oxide and other metal oxides; stannous chloride, stannic chloride, stannous bromide, stannic bromide, antimony fluoride, zinc chloride, magnesium chloride, aluminum chloride and other metal halogenides; tin sulfate, zinc sulfate, aluminum sulfate and other metal sulfates; magnesium carbonate, zinc carbonate and other metal carbonates; tin acetate, stannous octoate, tin lactate, zinc acetate, aluminum acetate and other metal organocarboxylates; tin trifluoromethanesulfonate, zinc trifluoromethanesulfonate, magnesium trifluoromethanesulfonate, tin methanesulfonate, tin p-toluenesulfonate and other metal organosulfonates; p-toluenesulfonic acid, methanesulfonic acid, trifluoromethanesulfonic acid and other organic sulfonic acid and other various acids; zinc borate and other metal borates; dibutyltinoxide and other organometal oxides of above metals; titanium isopropoxide and other metal alkoxides of above metals; and diethyl zinc and other alkyl metals of above metals. These catalysts can be used singly or as a combination.

No particular limitation is imposed upon the amount of the catalyst for use so long as the reaction velocity can be substantially accelerate. The amount of the catalyst is preferably in the range of 0.0001–5% by weight, more preferably 0.001–1% by weight in view of economy for the amount of component (A), aliphatic hydroxycarboxylic acid.

No particular limitation is imposed upon how to carry out the dehydration condensation of component (A) and component (B) with component (C) so long as at least a portion of water in the reaction system can be removed in at least a portion of the step in the process. However, an organic solvent can be preferably used in at least a portion of the step in the dehydration condensation. And when a cyclic dimer or lactone is used in place of component (A), the cyclic dimer or lactone can be preferably reacted with component (B) and component (C) under the same condition as the ring-opening polymerization of the cyclic dimer or lactone, that is, usually in a molten state.

In the preparation process of the degradable polymer of the invention, the reaction of component (A) and component (B) with component (C) can be carried out in any order, for example, by the processes 1)–4) shown below.

1) After dehydration condensation of component (A) and component (B) in the presence of a catalyst, component (C) is added and the dehydration condensation is further continued to obtain a degradable polymer having a high weight average molecular weight.
2) After dehydration condensation of component (A) and component (C) in the presence of a catalyst, component (B) is added and the dehydration condensation is further continued to obtain a degradable polymer having a high weight average molecular weight.
3) After dehydration condensation of component (A) in the presence of a catalyst, component (B) and component (C) are added and the dehydration condensation is further continued to obtain a degradable polymer having a high weight average molecular weight. In this case, component (B) and component (C) can be added at the same time or separately with a time internal.
4) Component (A), component (B) and component (C) are simultaneously charged and dehydration condensation is carried out in the presence of a catalyst to obtain a degradable polymer having a high weight average molecular weight.

On carrying out the reaction, these components can be charged at the same time as mentioned above or a portion of these components can be added later. However, it is preferred to charge these components at the same time. Because, generally, component (B) and (C) are easy to be dissolved in component (A) and the dehydration condensation can be effectively carried out at homogeneous state. When a portion of these components is added later, the intermediate polymer obtained by previous dehydration condensation has preferably a weight average molecular weight of 100,000 or less. When a portion of these component is added after the intermediate polymer exceeds a weight average molecular weight of 100,000, the molecular weight is liable to reduce due to the effect of addition and thus polymerization time unfavorably tends to be prolonged.

When a cyclic dimer or lactone is used in place of component (A), the reaction of a cyclic dimer or lactone and component (B) with component (C) can be carried out in any order. However, usually these components can be charged at the same time.

As described above, the dehydration condensation is preferably carried out at least a portion of the process in an organic solvent.

No particular restriction is imposed upon the organic solvent used in the process of the invention so long as at least a portion of water in the reaction system can be removed in at least a portion of the step in the process by conducting water removing procedures as mentioned hereinafter. The organic solvent can or cannot form an azeotropic mixture with water or can or cannot separate from water. However, preferred organic solvents of the invention can separate from water with ease by separation, distillation or other separating means.

No particular restriction is imposed upon the organic solvent used in the process of the invention so long as the progress of reaction can be substantially maintained. The organic solvent can be used singly or as a mixture.

Specific organic solvents which can be used in the invention include, for example, toluene, xylene, mesitylene and other hydrocarbon solvents: chlorobenzene, bromobenzene, iodebenzene, dichlorobenzene, 1,1,2,2-tetrachloroethane, p-chlorotoluene and other halogenated solvents; 3-hexanone, acetophenone, benzophenone and other ketone solvents; dibutyl ether, anisole, phenetole, o-dimethoxybenzene, p-dimethoxybenzene, 3-methoxytoluene, dibenzyl ether, benzyl phenyl ether, methoxynaphthalene and other ether solvents; phenyl sulfide, thioanisole and other thioether solvents; methyl benzoate, dimethyl phthalate, diethylphthalate and other ester solvents; diphenyl ether; di(4-methylphenyl)ether, di(3-methylphenyl)ether, 3-phenoxytoluene and other alkyl substituted diphenyl ethers; di(4-bromophenyl)ether, di(4-chlorophenyl)ether, 4-bromodiphenyl ether, 4-methyl-4'-bromodiphenyl ether and other halogen substituted diphenyl ethers; 4-methoxydiphenyl ether, di(4-methoxyphenyl) ether, di(3-methoxyphenyl)ether, 4-methyl-4'-methoxydiphenyl ether and other alkoxy-substituted diphenyl ethers; dibenzofuran, xanthene and other cyclic diphenyl ethers; and other diphenyl ether-based solvents. In these solvents, hydrocarbon solvents, halogenated solvents, diphenyl ether and alkyl substituted diphenyl ether solvents are preferably used, and toluene, xylene. dichlorobenzene and diphenyl ether are preferred in particular.

The boiling point of the organic solvent used in the invention is preferably 100° C. or above, more preferably 135° C. or above, most preferably 170° C. or above. The dehydration condensation can be efficiently carried out without accompanying unfavorable side reactions by progressing the reaction at a decreased temperature under high vacuum.

The amount of the organic solvent for use in the invention is not limited in particular so long as progress of the reaction can be maintained and generally set in view of industry by considering reaction velocity, purity of the resulting degradable polymer, volume efficiency and solvent recovery.

In the process of the invention, the organic solvent is preferably used in an amount so as to make the concentration of the resulting degradable polymer in the reaction mixture 10–80% by weight.

In the preparation process of the degradable polymer of the invention, it is preferred at least a portion of the steps in the process to accelerate progress of the reaction by reducing water in the reaction system through batchwise and/or continuous water removing procedures. The water removing procedures can be a recycle type or a reflux type.

The water removing procedures are not limited in particular so long as the water in the reaction system can be reduced.

Embodiments of water removing procedures include,
1) a method for previously charging the organic solvent in excess and removing a portion thereof from the reaction system simply,
2) a method for drying the organic solvent by using other organic solvents,
3) a method for removing a portion of the solvent from the reaction system, dehydrating outside the reaction system by treatment with a drying agent or distillation in order to obtain the organic solvent having the amount of water less than that of the removed organic solvent and returning again to the reaction system.

The water removing procedure in such a case of 3), can reduce the water content of the organic solvent returning to the reaction system to preferably 50 ppm or less, more preferably 25 ppm or less, most preferably 5 ppm or less.

No particular restriction is imposed upon the drying agent for use in the invention so long as water content of the organic solvent in the reaction system can be substantially reduced to such a level that the reaction progress can be maintained, or a degradable polymer having a sufficiently high molecular weight can be formed, or reversible hydrolysis of the resultant degradable polymer can be inhibited.

Representative drying agents which can be used in the invention include, for example, molecular sieve 3A, molecular sieve 4A, molecular 5A, molecular sieve 13X and other grades of molecular sieve; ion exchange resin, alumina, silica gel, calcium chloride, calcium sulfate, diphosphorouspentoxide, concentrated sulfuric acid, magnesium perchlorate, barium oxide, calcium oxide, potassium hydroxide, sodium hydroxide; calcium hydride, sodium hydride, lithium aluminum hydride and other metal hydrides; and sodium and other alkali metal. These drying agents can be used singly or as a mixture. Molecular sieve and ion exchange resin are particularly preferred in view of ease in handling and regeneration.

When an organic solvent is used in the preparation process of the invention, no particular limitation is imposed upon the reaction temperature so long as the organic solvent in the reaction system can substantially maintain a liquid state and maintain progress of the dehydrating condensation. Generally, the reaction temperature is in the range of preferably 100–200° C., more preferably 110–180° C. in view of a formation rate and thermal decomposition velocity of the degradable polymer.

The reaction is usually carried out under atmospheric pressure at the distilling temperature of the organic solvent used. In order to maintain the reaction temperature in a preferable range, the reaction can also be carried out under reduced pressure, when a high boiling point organic solvent is used. Even though a boiling point is reduced due to azeotropic distillation of the organic solvent with water, no problem takes place so long as the progress of the dehydrating condensation can be substantially maintained at the prescribed temperature.

When the reaction is carried out at the molten state in the invention, no particular restriction is put upon the reaction temperature so long as the reaction can proceed while substantially maintaining the molten state of the degradable polymer in the reaction system. Specifically, the reaction is carried out at a temperature higher than the melting point of the degradable polymer in the reaction system. It is preferred to react in the temperature range from the melting point to 250° C.

The preparation process of the degradable polymer in the invention is preferably carried out under vacuum or in an inert atmosphere such as nitrogen and argon while protecting the reaction system from contamination of outside moisture and removing moisture generated in the reaction system. The reaction can also be carried out while ventilating or bubbling the inert gas into the reaction system.

In the preparation process of the degradable polymer in the invention, the reaction, dehydration of the organic solvent and charge of the solvent can be carried out continuously or batchwise.

No particular restriction is imposed upon the method which is adopted in the invention for recovering the reaction product, that is, the degradable polymer from the reaction mixture after finishing the reaction, so long as the method can substantially recover the reaction product in a desired purity.

The recovery of the reaction product can be carried out by any known methods. Representative recovering methods include, for example, adding a poor solvent such as isopropyl alcohol in excess at a suitable temperature after finishing the reaction to a reaction mixture containing the reaction product, recovering precipitated crystals of the reaction product by decantation or filtration, washing the crystals thoroughly with a poor solvent, and drying the crystals.

The weight average molecular weight and molecular weight distribution of the degradable polymer in the invention can be controlled to a desired range by suitably selecting reaction conditions such as species of the organic solvent, species and amount of the catalyst, reaction temperature, reaction time, treatment method of the azeotropically distilled organic solvent, and extent of dehydration of the organic solvent in the reaction system.

The weight average molecular weight of the degradable polymer in the invention is preferably in the range of 50,000–1,000,000, more preferably 100,000–1,000,000, most preferably 200,000–1,000,000.

The degradable polymer of the invention has an advantage in coloration as compared with a copolymer obtained by addition of a degradable high molecular weight side chain to polysaccharide.

The degradable polymer of the invention is characterized by having an equivalent or higher transparency as compared to common aliphatic polyester.

The degradable polymer of the invention is characterized in a markedly higher melt tension as compared to common aliphatic polyester. The characteristic has greatly improved processing ability and has enabled one to prepare various kinds of molded products.

The desired properties of the degradable polymer in the invention can be provided by selecting species and composition of aliphatic hydroxycarboxylic acid which is a component of the side chain. The aliphatic polyhydroxycarboxylic acid component which constitutes the side chain can be a homopolymer or copolymer. The configuration of the copolymer can be a random copolymer, alternative copolymer, block copolymer and graft copolymer. The structure of aliphatic polyhydroxycarboxylic acid which constitutes the side chain is not restricted in particular and can be linear or branched.

The structure of the degradable polymer in the invention can be obtained by adding a degradable high molecular weight side chain to a polyfunctional base compound and combining the resulting star-shaped polymers to each other through aliphatic polyhydric alcohol having two or more hydroxyl groups or polycarboxylic acid or anhydride thereof having two or more carboxyl groups. The structure is considered to exert high melt tension mentioned above.

The evaluation method of melt tension is described in detail, for example, in Handbook of Plastics Processing Technology [Pages 1414 to 1416, (2) Melt Tension; edited by Kobunshi Gakkai, published from Nikkan Kogyo Shinbunsha (1995)].

Melt tension is a tensile force required for stretching a molten strand to a certain diameter and is measured by extruding the strand from a melt indexer at a certain velocity and determining the force with a melt tension measuring apparatus at a temperature corresponding to the practical processing temperature. Generally, high melt tension improves bubble stability in inflation molding and reduces draw down in blow molding. When melt tension is high, a neck-in phenomenon which decreases the width of an extruded film or sheet after delivering from a T-die is also is reduced and thickness accuracy of film becomes high.

The melt tension is evaluated by the following procedures in the invention. That is, the melt-flow index is measured under 2160 g load at suitable two temperatures. The relation between the temperature and melt-flow index is plotted, a temperature for providing a melt-flow index of 10 g/10 minutes is obtained on the plot, and melt tension is measured at the temperature.

Polystyrene has a melt tension of approximately 1 g under the above measuring conditions. Generally, a melt tension higher than that of polystyrene is recognized to be suitable for a material of foam. Specifically, a melt tension of around 5 g is suited for blow-molding, inflation molding and foam molding. On the other hand, polylactic acid has a melt tension of 0.6 g and thus the melt tension has been insufficient for carrying out blow molding, inflation molding and foam molding.

On the contrary, the degradable polymer of the invention can control the melt tension to a desired range by the species and amount of component (B) and molecular weight of the degradable polymer. Specifically, the increase in the amount of component (B) and the molecular weight of the degradable polymer of the invention is liable to increase melt tension. The preparation process of the invention can easily provide a degradable polymer having high melt tension of 5 g or more.

Further, the degradable polymer of the invention can control the value of YI to a desired range by the species of component B. The value of YI indicates extent of hue deviation from colorless or white to the direction of yellow. A positive value indicates shift to the direction of yellow and a negative value indicates shift to the direction of blue.

Generally, when YI is 3 or less, yellowness is scarcely observed and the hue is close to colorless. When YI exceeds 3, yellowness increases gradually. When YI exceeds 10, the hue becomes severely brown. A copolymer prepared by conventional technique from polysaccharide such as cellulose and lactide or hydroxycarboxylic acid has a high melt tension. However, the copolymer is liable to have YI of 10 or more. On the contrary, the process of the invention can provide a degradable polymer having YI of 10 or less easily. Particularly, when pentaerythritol is used as component (B) in the invention, YI is generally low and 3 or less. The degradable polymer of the invention preferably has YI of 3 or less, more preferably 2 or less in view of appearance and ease in dyeing of the resulting molded articles.

The degradable polymer of the invention is characterized by absence of color in addition to a high melt tension and high molecular weight and is expected to be applied to wide uses by utilizing the characteristics. Specific uses include film, sheet, blown bottle, foam and filament. These articles have excellent appearance as compared with a conventional graft copolymer having a high melt tension which is prepared from polysaccharide such as cellulose and lactide or aliphatic hydroxycarboxylic acid. Further, these molded articles can be freely dyed by utilizing the coloration characteristics of the degradable polymer.

The degradable polymer of the invention is suited for application to blow molding, foam molding, extrusion forming and other processing methods which require strength of a molten polymer. For example in the case of sheet extrusion, reduction of sheet width due to draw down or neck-in of the molten sheet can be depressed by using the degradable polymer of the invention.

Next, uses of the degradable polymer obtained by the invention will hereinafter be illustrated in detail.

No particular restriction is imposed upon the processing method of the degradable polymer in the invention. Specifically, injection molding, extrusion molding, inflation molding, extrusion blow molding, foam molding, spinning, calendering, blow molding and balloon molding are preferably applied and inflation molding, blow molding, extrusion blow molding, foam molding and spinning are preferred in particular.

Articles which can be prepared by a suitable processing method from the degradable polymer of the invention and are suitably used in various fields include, for example, parts of writing utensil such as ball point pen, mechanical pencil and pencil, stationary parts, golf tee, parts of a smoking golf ball used for an opening ceremony, oral medicine capsule, suppository carrier for the anus and the vagina, carrier of sticking medicine for skin and mucous membrane, agricultural chemicals capsule, fertilizer capsule, seedling capsule, compost bag, fishing line reel, fishing float, fishing buoy, fishing lure, hunting decoy, hunting shot capsule, dinner set and other camping goods, nail, pile, tying material, nonskid materials and blocks for muddy place and snowy road, lunch box, dinner set, disposable containers of lunch and daily dishes which are marketed in convenience stores, chopsticks, half-split chopsticks, fork, spoon, skewer, toothpick, containers of cupped chinese noodles, cups used for a vending machine of drinks, containers and trays of fresh fishes, fresh meat, vegetables and fruits, bean curd, common dishes and other foodstuffs, boxes used in a fresh fish market place, bottles of milk, yogurt, lactic acid beverage and other dairy products, bottles of carbonated drink, mineral water and other soft drinks, bottles of beer, whisky and other liquors, bottles with or without a pumping system for shampoo and liquid soap, toothpaste tube, toiletry container, detergent bottle, bleaching agent bottle, cold-reserving box, flower pot, cartridge casing of water purifier, casing for artificial kidney and artificial liver, parts of injection syringe, and cushioning materials used for transporting household electric appliances such as television and stereophone, precision machines such as computer printer and watch, and ceramic products such as glass and pottery.

The degradable polymer of the invention is a suitable material for processing into a film and sheet.

The film or sheet comprising the degradable polymer of the invention can be prepared by already known techniques such as extrusion, coextrusion, calendering, hot pressing, solvent casting, inflation molding, balloon molding and tentering.

Preparation conditions are set in consideration of the thermal property, molecular structure and crystallinity of the degradable polymer used.

Biaxial stretching can be carried out by way of inflation molding or balloon molding and thus strong products having a low elongation, high elastic modulus and high toughness can be prepared at high productivity with a relatively low cost. These products are in the form of a seamless bag and thus suitable for fabricating into a carryout bag for a supermarket, a bag for preventing the surrounding from wetting by dew drops on a low temperature pack of foodstuffs such as refrigerated food and fresh meat, a compost bag and other miscellaneous bags.

By combination with a co-extrusion method, a multi-layer film can be prepared with a high productivity from two or more degradable polymers of the invention having different properties and/or other polymers. The co-extrusion method can also be combined with the inflation molding method or balloon molding method.

The film or sheet comprising the degradable polymer of the invention is a material also suited for successive processing such as stretching, blowing and vacuum forming in order to provide a two-dimensional or three-dimensional shape.

The film and sheet comprising the degradable polymer of the invention can be suitably used for a shopping bag, garbage bag, compost bag, cement bag, fertilizer bag, packaging film for foodstuffs and confectionery, food wrapping film, agrohorticultural film, greenhouse film, packaging film for video, audio and other magnetic tape cassette recorders, film for packaging a floppy disk, fence, oil fence for ocean, river and lake, adhesive tape, tape, tying material, waterproof sheet, umbrella and sunshade tent, and sandbag.

A porous film having gas permeability can also be prepared by extruding a degradable polymer comprising calcium carbonate, barium sulfate, titanium oxide and other inorganic materials and further stretching the resulting film. The porous film can be used for a diaper cover and other packaging films for specific uses.

A seamless pipe comprising the degradable polymer of the invention can be prepared by extruding through a circular die. By combination with a coextrusion method, a multilayer seamless pipe can be prepared from two or more degradable polymers of the invention which differ in properties and/or other species of polymer.

A square bar or circular block comprising the degradable polymer of the invention can be prepared by extruding through a die. Combination of such extrusion with a coextrusion method can prepare a square bar or circular block having a section of multilayer structure, that is, specific structure of sectional layer and sectional profile like an annual ring of a tree by using two or more degradable polymers of the invention which differ in properties and/or other species of polymer.

On processing the degradable polymer of the invention into a film and sheet, additives such as antioxidant, heat stabilizer, ultraviolet absorber, lubricant, filler, adhesion inhibitor, antistatic agent, surface wetting improver, incineration auxiliary material, antislipping agent and colorant can be suitably selected depending upon the extrusion condition, stretching condition and other objects in order to prepare the film and sheet comprising the degradable polymer of the invention and having desired properties such as gas-barrier property, optical property, wave length spectrum of transmitting light, sunshade property, oil resistance and other characteristics.

A post-treatment step and finishing step which can be carried out depending upon the object on processing the degradable polymer of the invention into a film and sheet include, for example, welding, heat sealing, provision of machine sewing line, primer coating, adhesive coating, agent coating, parkarizing, deposition, spattering, CVD, coating, etching, spraying, dyeing, static coating, air brushing, lamination, sandwiching, embossing, provision of three-dimensional pattern, corrugation, printing, reproduction, sanding, sandblasting, shirring, punching, honey-comb construction forming, provision of corrugated fiber broad structure, formation of laminated structure, screen printing, gravure printing, relief printing, intaglio printing, doctor blade coating, dipping and other fabrication methods which are known in public.

The film or sheet comprising the degradable polymer of the invention can also form a multilayer lamination structure by laminating or adhering to a sheet of other materials such as paper and other polymers.

As mentioned above, the degradable polymer of the invention has a high melt tension and is thus suitable for preparing foam which has low density. The foam has many gaps such as air bubble, void, microvoid and cavity in the interior of the resin. The foam includes a resin structure of two-place construction having an open or closed place of gaps which is scattered in the continuous phase of the resin having a low apparent density. The foam generally includes, for example, a polymer having a cellular structure, foamed high polymer, expanded high polymer, high polymer foam, rigid polymer foam and flexible polymer foam.

The foam comprising the degradable polymer of the invention can be prepared by known processes such as foaming by gas pouring-in and bead foaming. The properties of the foam such as open cell content, closed cell content, size, shape, distribution and uniformity of gaps including air bubble, void, microvoid and cavity can be suitably controlled by setting foaming conditions depending upon the object.

Foaming agents used for preparing the foam include an inert gas, chemical foaming agent which generates the inert gas by decomposition, hydrocarbon or chlorinated hydrocarbon having 5–7 carbon atoms, fluorocarbon, water, nitrogen, LPG, LNG, low boiling point organic liquid, carbon dioxide, inert gas, and ammonia.

Exemplary chemical foaming agents include sodium hydrogen carbonate, dinitrosopentamethylenetetramine, sulfonyl hydrazide, azodicarbonamide, p-toluenesulfonyl semicarbazide, 5-phenyltetrazole, diisopropylhydrazodicarboxylase, 5-phenyl-3,6-dihydro-1,3,4-oxadiazine2-one and sodium boron hydroxide.

Exemplary physical foaming agents include n-pentane, 2,2-dimethylpropane, 1-pentene and other pentanes, n-hexane, 2-methylpentane, 3-methylpentane, 2,2-dimethylbutane, cyclohexane and other hexanes; n-heptane, 2,2-dimethylpentane, 2,4-dimethylpentane, 3-ethylpentane, 1-heptene and other heptanes; toluene, trichloromethane, tetrachloromethane, trichlorofluoromethane, methanol, 2-propanol, isopropyl ether and methyl ethyl ketone.

Exemplary fluorocarbons include CFC-11, CFC-12, CFC-113, CFC-114 and other fluorocarbons of CFC-series.

Exemplary substitutes for chlorofluorocarbons (CFC) include HCFC-141a, HCFC-142b, HFC-134a, HCFC-141b, HCFC-22, HFC-32, HFC-125, HCFC-124, HFC-125, HFC-152a and HCFC-123.

Foams comprising the degradable polymer of the invention can be applied to various uses which include, for example, a lunch box, dinner set, disposable containers of lunch and daily dishes which are marketed in convenience stores, containers of cupped Chinese noodles, cups used for a vending machine of drinks, containers and trays of fresh fish, fresh meat, vegetables and fruits, bean curd, fermented soybeans, common dishes and foodstuffs, boxes used in a market place of fresh fishes, containers of milk, yogurt, lactic acid beverage and other dairy products, bottles of carbonated drink, mineral water and other soft drinks, containers of beer, whisky and other liquors, toiletry container, detergent bottle, bleaching agent bottle, cold reserving box, flower pot, cushioning materials used for transporting household electric appliances such as tape, television and stereophone, precision machines such as computer, printer and watch, optical instruments such as camera, glasses, microscope and telescope, and ceramic products such as glass and pottery, and sunshade material, thermal insulation material and soundproof material.

Foams comprising the degradable polymer of the invention can also be suitably applied to medical and sanitary uses. These uses include, for example, a bandage, carrier of sticking medium for skin and mucous membrane, triangle bandage, adhesive tape, towel, disposable towel, disposable wet towel, wet hand towel, dustcloth, tissue, wet tissue for cleaning and disinfection, wet tissue for wiping baby hips, disposable diaper, physiological and menstruation napkin, menses tampon, blood absorbing tampon on surgery and birth, sanitary cover stock material and sterilization bag.

These medical and sanitary products can be disinfected, pasteurized or sterilized by exposure to heat, steam, ethylene oxide gas, hydrogen peroxide or ozone, by irradiation of ultraviolet rays, electromagnetic wave or gamma rays, or by using ethanol, benzalkonium chloride or other sterilization agents, and can be successively subjected to germ-free packaging. These products can also be prepared and packed in a germ-free condition or a endotoxin-free condition by installing processing steps in a clean bench or clean room where ultra clean air can be ventilated in a laminar flow through a HEPA filter.

Forms comprising the degradable polymer of the invention can be suitably used for common applications in industry including agriculture, fishery, forestry, manufacturing industry, civil engineering and construction industry and transportation and communication industry, and for recreational applications including leisure and sports. For example, these foams can be suitably used for an agricultural victoria lawn, oil absorber, weak ground reinforcement, artificial leather, floppy disk back, sandbag, thermal insulation material, soundproof material, cushioning material, cushioning material for bed, chair and other furniture, cushion floor, packaging material, tying material and skidproof material for a muddy place or snowy road.

EXAMPLE

The present invention will hereinafter be illustrated in detail by way of synthetic examples, embodiments and examples.

Following evaluation methods were used in the examples.

(1) Weight average molecular weight

Weight average molecular weight (Mw) of the degradable polymer obtained was measured by gel permeation chromatography at a column temperature of 40° C. in a chloroform solvent. Polystyrene was used as reference.

(2) Water content in a solvent

Measured with a Karl Fischer's moisture meter, MKC-210 (manufactured by Kyoto Denshi Kogyo Co.).

(3) Differential thermal analysis

Measured with a scanning calorimeter, DSC-3100 (manufactured by Mac Science Co.) at a temperature range of −20° C. to 230° C.

(4) Tensile strength

Measured in accordance with JIS K-6732 by using a film specimen.

(5) Flexural strength

Flexural strength was measured on a film specimen in accordance with JIS K-7113.

(6) Transparency

Evaluated by Haze with a film specimen.

Haze was measured with a Haze meter, TC-HIII (manufactured by Tokyo Denshoku Co.), in accordance with JIS K-6714.

(7) Yellowness (YI-value)

A plate specimen having a thickness of 2 mm was prepared. Yellowness was measured with a SM color computer, SM-6-IS-2B (manufactured by Suga Shikenki Co.) in accordance with JIS K-7103.

(8) Melt tension (MT-value)

A melt flow index was measured at two suitable temperatures under 2160 g load. A temperature providing a melt flow index of 10 g/10 minutes was obtained from the temperature-melt flow index plot. Melt tension was measured at the temperature.

(9) Degradability

A film was buried in a compost at room temperature for 30 days. The degradability was evaluated by measuring tensile strength of the film before and after the burying test.

Example 1

To a 500 ml round bottomed flask, 109.4 g of 88% L-lactic acid, 0.1091 g of pentaerythritol, 0.1894 g of succinic acid and 0.45 g of stannous oxide were charged and heated with stirring at 140° C./100 mmHg for 3 hours while distilling water out of the reaction system. Thereafter, a Dean Stark trap which was charged with 72 g of o-dichlorobenzene was mounted on the flask and further 77 g of o-dichlorobenzene was added to the reaction mass and azeotropic dehydration was carried out at 140°' C./270 mmHg for 4 hours. The Dean Stark trap was dismantled and a tube packed with 30 g of molecular sieve 3A and 54 g of o-dichlorobenzene having water content of 10 ppm or less was mounted so as to return the reflux-distilled organic solvent to the reaction system again after passing through the molecular sieve. The reaction was continued by heat-stirring at 140° C./270 mmHg for 23 hours which prevented the reaction system from contamination by water.

After passing through the molecular sieve, the organic solvent had a water content of 2 ppm. The reaction mixture was cooled to 30° C., mixed with 800 ml of a 0.7% hydrochloric acid/isopropyl alcohol solution, stirred for an hour and suction filtered. The operation was carried out twice in order to remove the tin powder.

Successively, the filter cake was stirred in 600 ml of isopropyl alcohol and suction filtered. The procedure was repeated until the filtrate became neutral and the filter cake was dried at 60° C. in heat air. The degradable polymer thus obtained was 61.8 g. The yield was 80%. The degradable polymer had a weight average molecular weight of 244,000, and a glass transition temperature of 56.5° C. and melting point of 158.4° C. by differential thermal analysis.

A press film was prepared by hot-pressing the resulting degradable polymer at 180° C. The press film had following properties.

Thickness: 155–161 μm

Tensile strength: 540 kg/cm$^2$ (break)

Elongation: 8%

Haze: <1%

Flexural strength: 830 kg/cm$^2$

The temperature indicating a melt flow index (MI-value) of 10 g/10 minutes, melt tension (MT-value) at the temperature, yellowness (YI-value) and evaluation on degradability are:

Temperature (MI: 10 g/10 min): 187° C.

Melt tension (MT-value): 2.2 g

Yellowness (YI-value): 1.7

Degradability: Film strength could not be measured due to degradation.

Example 2

To a 500 ml round bottomed flask, 103.2 g of 88% L-lactic acid, 0.2061 g of pentaerythritol, 0.3575 g of succinic acid and 0.43 g of stannous oxide were charged and heated with stirring at 140° C./100 mmHg for 3 hours while distilling water out of the reaction system. Thereafter, a Dean Stark trap which was charged with 72 g of o-dichlorobenzene was mounted on the flask and further 72 g of o-dichlorobenzene was added to the reaction mass and azeotropic dehydration was carried out at 140° C./270 mmHg for 4 hours. The Dean Stark trap was dismantled and a tube packed with 30 g of molecular sieve 3A and 72 g of o-dichlorobenzene having water content of 10 ppm or less was mounted so as to return the reflux-distilled organic solvent to the reaction system again after passing through the molecular sieve. The reaction was continued by heat-stirring at 140° C./270 mmHg for 12 hours which prevented the reaction system from contamination by water.

After passing through the molecular sieve, the organic solvent had a water content of 2 ppm. The reaction mixture was cooled to 30° C., mixed with 800 ml of a 0.7% hydrochloric acid/isopropyl alcohol solution, stirred for an hour and suction filtered. The operation was carried out twice in order to remove the tin powder.

Successively, the filter cake was stirred in 600 ml of isopropyl alcohol and suction filtered. The procedure was repeated until the filtrate became neutral and the filter cake was dried at 60° C. in heat air. The degradable polymer thus obtained was 63.6 g. The yield was 87%. The degradable polymer had a weight average molecular weight of 430,000, and a glass transition temperature of 57.0° C. and melting point of 156.1° C. by differential thermal analysis.

A press film was prepared by hot-pressing the resulting degradable polymer at 180°' C. The press film had following properties.

Thickness: 156–163 µm
Tensile strength: 530 kg/cm² (break)
Elongation: 9%
Haze: <1%
Flexural strength: 830 kg/cm²

The temperature indicating a melt flow index (MI-value) of 10 g/10 minutes, melt tension (MT-value) at the temperature, yellowness (YI-value) and evaluation on degradability are:

Temperature (MI: 10 g/10 min): 200° C.
Melt tension (MT-value): 5.5 g
Yellowness (YI-value): 1.6
Degradability: Film strength could not be measured due to degradation.

Example 3

To a 500 ml round bottomed flask, 103.2 g of 88% L-lactic acid, 0.1015 g of trimethylolpropane, 0.1340 g of succinic acid and 0.43 g of stannous oxide were charged and heated with stirring at 140° C./100 mmHg for 3 hours while distilling water out of the reaction system. Thereafter, a Dean Stark trap which was charged with 72 g of o-dichlorobenzene was mounted on the flask and further 72 g of o-dichlorobenzene was added to the reaction mass and azeotropic dehydration was carried out at 140° C./270 mmHg for 4 hours. The Dean Stark trap was dismantled and a tube packed with 30 g of molecular sieve 3A and 72 g of o-dichlorobenzene having water content of 10 ppm or less was mounted so as to return the reflux-distilled organic solvent to the reaction system again after passing through the molecular sieve. The reaction was continued by heat-stirring at 140° C./270 mmHg for 18 hours which prevented the reaction system from contamination by water.

After passing through the molecular sieve, the organic solvent had a water content of 2 ppm. The reaction mixture was cooled to 30° C., mixed with 800 ml of 0.7% hydrochloric acid/isopropyl alcohol solution, stirred for an hour and suction filtered. The operation was carried out twice in order to remove the tin powder. Successively, the filter cake was stirred in 600 ml of isopropyl alcohol and suction filtered. The procedure was repeated until the filtrate became neutral and the filter cake was dried at 60° C. in heat air. The degradable polymer thus obtained was 59.6 g. The yield was 82%. The degradable polymer had a weight average molecular weight of 323,000, and a glass transition temperature of 56.8° C. and melting point of 158.1° C. by differential thermal analysis.

A press film was prepared by hot-pressing the resulting degradable polymer at 180° C. The press film had following properties.

Thickness: 153–159 µm
Tensile strength: 540 kg/cm² (break)
Elongation: 8%
Haze: <1%
Flexural strength: 830 kg/cm²

The temperature indicating a melt flow index (MI-value) of 10 g/10 minutes, melt tension (MT-value) at the temperature, yellowness (YI-value) and evaluation on degradability are:

Temperature (MI:10 g/10 min): 192° C.
Melt tension (MT-value): 2.5 g
Yellowness (YI-value): 2.8
Degradability: Film strength could not be measured due to degradation.

Example 4

To a 500 ml round bottomed flask, 103.2 g of 88% L-lactic acid, 0.1030 g of pentaerythritol, 0.2211 g of adipic acid and 0.43 g of stannous oxide were charged and heated with stirring at 140° C./100 mmHg for 3 hours while distilling water out of the reaction system. Thereafter, a Dean Stark trap which was charged with 72 g of o-dichlorobenzene was mounted on the flask and further 72 g of o-dichlorobenzene was added to the reaction mass and azeotropic dehydration was carried out at 140° C./270 mmHg for 4 hours. The Dean Stark trap was dismantled and a tube packed with 30 g of molecular sieve 3A and 72 g of o-dichlorobenzene having water content of 10 ppm or less was mounted so as to return the reflux-distilled organic solvent to the reaction system again after passing through the molecular sieve. The reaction was continued by heat-stirring at 140° C./270 mmHg for 20 hours which prevented the reaction system from contamination by water.

After passing through the molecular sieve, the organic solvent had a water content of 2 ppm. The reaction mixture was cooled to 30° C., mixed with 800 ml of a 0.7% hydrochloric acid/isopropyl alcohol solution, stirred for an hour and suction filtered. The operation was carried out twice in order to remove the tin powder.

Successively, the filter cake was stirred in 600 ml of isopropyl alcohol and suction filtered. The procedure was repeated until the filtrate became neutral and the filter cake was dried at 60° C. in heat air. The degradable polymer thus obtained was 60.7 g. The yield was 83%. The degradable polymer had a weight average molecular weight of 302,000, and a glass transition temperature of 57.2° C. and melting point of 158.3° C. by differential thermal analysis.

A press film was prepared by hot-pressing the resulting degradable polymer at 180° C. The press film had following properties.

Thickness: 154–160 µm
Tensile strength: 510 kg/cm² (break)
Elongation: 9%
Haze: <1%
Flexural strength: 790 kg/cm²

The temperature indicating a melt flow index (MI-value) of 10 g/10 minutes, melt tension (MT-value) at the temperature, yellowness (YI-value) and evaluation on degradability are:

Temperature (MI: 10 g/10 min): 190° C.
Melt tension (MT-value): 3.0 g
Yellowness (YI-value): 2.5
Degradability: Film strength could not be measured due to degradation.

Example 5

To a 500 ml stainless-steel reactor, 72.0 g of L-lactide, 0.1021 g of pentaerythritol, 0.1771 g of succinic acid, and 7.22 g of a toluene solution containing 0.0144 g of stannous octoate were charged and uniformly mixed. After distilling off toluene at 40° C./2 mmHg, the residual mixture was heated to 170° C. over 1.5 hours and reacted at 200° C. for 2 hours. Successively, the unreacted monomer was distilled out of the reaction system at 200° C./2 mmHg over an hour. The residual mass was cooled in a dry nitrogen atmosphere. The degradable polymer thus obtained was 58.3 g. The yield was 81%. The degradable polymer had a weight average molecular weight of 333,000, and a glass transition temperature of 57.0° C. and melting point of 158.0° C. by differential thermal analysis.

A press film was prepared by hot-pressing the resulting degradable polymer at 180° C. The press film had following properties.

Thickness: 154–159 µm

Tensile strength: 530 kg/cm$^2$ (break)

Elongation: 8%

Haze: <1%

Flexural strength: 820 kg/cml

The temperature indicating a melt flow index (MI-value) of 10 g/10 minutes, melt tension (MT-value) at the temperature, Yellowness (YI-value) and evaluation on degradability are:

Temperature (MI: 10 g/10 min): 193° C.

Melt tension (MT-value): 2.3 g

Yellowness (YI-value): 2.2

Degradability: Film strength could not be measured due to degradation.

Example 6

To a 500 ml round bottomed flask, 104.3 g of 88% L-lactic acid, 0.7497 g of butane-1,2,3,4-tetracarboxylic anhydride and 0.6899 g of 1,4-butanediol were charged. After heat-dissolving butane-1,2,3,4-tetracarboxylic anhydride, 0.43 g of stannous oxide was added and heated with stirring at 140° /100 mmHg for 3 hours while distilling water out of the reaction system. Thereafter, a Dean Stark trap which was charged with 72 g of o-dichlorobenzene was mounted on the flask and further 73.4 g of o-dichlorobenzene was added to the reaction mass and azeotropic dehydration was carried out at 140° C./270 mmHg for 4 hours. The Dean Stark trap was dismantled and a tube packed with 30 g of molecular sieve 3A and 54 g of o-dichlorobenzene having water content of 10 ppm or less was mounted so as to return the reflux-distilled organic solvent to the reaction system again after passing through the molecular sieve. The reaction was continued by heat-stirring at 140° C./270 mmHg for 23 hours which prevented the reaction system from contamination by water.

After passing through the molecular sieve, the organic solvent had a water content of 2 ppm. The reaction mixture was cooled to 30° C., mixed with 800 ml of a 0.7% hydrochloric acid/isopropyl alcohol solution, stirred for an hour and suction filtered. The operation was carried out twice in order to remove the tin powder.

Successively, the filter cake was stirred in 600 ml of isopropyl alcohol and suction filtered. The procedure was repeated until the filtrate became neutral and the filter cake was dried at 60° C. in heat air. The degradable polymer thus obtained was 56.2 g. The yield was 75%. The degradable polymer had a weight average molecular weight of 412,000, and a glass transition temperature of 54.7° C. and melting point of 149.1° C. by differential thermal analysis.

A press film was prepared by hot-pressing the resulting degradable polymer at 180° C. The press film had following properties.

Thickness: 137–142 µm

Tensile strength: 600 kg/cm$^2$ (break)

Elongation: 7%

Haze: <1%

Flexural strength: 860 kg/cm$^2$

The temperature indicating a melt flow index (MI-value) of 10 g/10 minutes, melt tension (MT-value) at the temperature, yellowness (YI-value) and evaluation on degradability are:

Temperature (MI: 10 g/10 min): 205° C.

Melt tension (MT-value): 10.0 g

Yellowness (YI-value): 8.0

Degradability: Film strength could not be measured due to degradation.

Example 7

To a 500 ml round bottomed flask, 103.7 g of 88% L-lactic acid and 0.1528 g of butane-1,2,3,4-tetracarboxylic anhydride were charged. After heat-dissolving butane-1,2,3,4-tetracarboxylic anhydride, 0.43 g of stannous oxide was added and heated with stirring at 140° C./100 mmHg for 3 hours while distilling water out of the reaction system. Thereafter, a Dean Stark trap which was charged with 73 g of o-dichlorobenzene was mounted on the flask and further 73.0 g of o-dichlorobenzene was added to the reaction mass and azeotropic dehydration was carried out at 140° C./270 mmHg for 4 hours. Successively, the Dean Stark trap was dismantled and a tube packed with 30 g of molecular sieve 3A and 54 g of o-dichlorobenzene having water content of 10 ppm or less was mounted so as to return the reflux-distilled organic solvent to the reaction system again after passing through the molecular sieve. The reaction was continued by heat-stirring at 140° C./270 mmHg for 7 hours which prevented the reaction system from contamination by water. When the molecular weight was attained to 73,000, 0.1401 g of 1,4-butanediol was added and further reacted at 140° C./270 mmHg for 18 hours.

After passing through the molecular sieve, the organic solvent had a water content of 2 ppm. The reaction mixture was cooled to 30° C., mixed with 800 ml of a 0.7% hydrochloric acid/isopropyl alcohol solution, stirred for an hour and suction filtered. The operation was carried out twice in order to remove the tin powder.

Successively, the filter cake was stirred in 600 ml of isopropyl alcohol and suction filtered. The procedure was repeated until the filtrate became neutral and the filter cake was dried at 60° C. in heat air. The degradable polymer thus obtained was 56.3 g. The yield was 77%. The degradable polymer had a weight average molecular weight of 334,000, and a glass transition temperature of 57.9° C. and melting point of 159.8° C. by differential thermal analysis.

A press film was prepared by hot-pressing the resulting degradable polymer at 180° C. The press film had following properties.

Thickness: 147–152 µm

Tensile strength: 620 kg/cm$^2$ (break)

Elongation: 7%

Haze: <1%

Flexural strength: 880 kg/cm$^2$

The temperature indicating a melt flow index (MI-value) of 10 g/10 minutes, melt tension (MT-value) at the temperature, yellowness (YI-value) and evaluation on degradability are:

Temperature (MI: 10 g/10 min): 201° C.

Melt tension (MT-value): 5.0 g

Yellowness (YI-value): 7.0

Degradability: Film strength could not be measured due to degradation.

Example 8

To a 500 ml round bottomed flask, 103.7 g of 88% L-lactic acid and 0.1585 g of 1,2,3,4,5,6-cyclohexanehexacarboxylic acid were charged. After heat-dissolving 1,2,3,4,5,6-cyclohexanehexacarboxylic acid, 0.43 g of stannous oxide was added and heated with stirring at 140° C./100 mmHg for 3 hours while distilling water out of the reaction system. Thereafter, a Dean Stark trap which was charged with 73 g of o-dichlorobenzene was mounted on the flask and further 72.7 g of o-dichlorobenzene was added to the reaction mass and azeotropic dehydration was carried out at 140° C./270 mmHg for 4 hours. Successively, the Dean Stark trap was dismantled and a tube packed with 30 g of molecular sieve 3A and 54 g of o-dichlorobenzene having water content of 10 ppm or less was mounted so as to return the reflux-distilled organic solvent to the reaction system again after passing through the molecular sieve. The reaction was continued by heat-stirring at 140° C./270 mmHg for 15 hours which prevented the reaction system from contamination by water. When the molecular weight was attained to 83,000, 0.1209 g of 1,4-butanediol was added and further reacted at 140° C./270 mmHg for 32 hours.

After passing through the molecular sieve, the organic solvent had a water content of 2 ppm. The reaction mixture was cooled to 30° C., mixed with 800 ml of a 0.7% hydrochloric acid/isopropyl alcohol solution, stirred for an hour and suction filtered. The operation was carried out twice in order to remove the tin powder.

Successively, the filter cake was stirred in 600 ml of isopropyl alcohol and suction filtered. The procedure was repeated until the filtrate became neutral and the filter cake was dried at 60° C. in heat air. The degradable polymer thus obtained was 56.3 g. The yield was 77%. The degradable polymer had a weight average molecular weight of 272,000, and a glass transition temperature of 57.7° C. and melting point of 161.1° C. by differential thermal analysis.

A press film was prepared by hot-pressing the resulting degradable polymer at 180° C. The press film had following properties.

Thickness: 126–132 $\mu$m

Tensile strength: 600 kg/cm$^2$ (break)

Elongation: 5%

Haze: <1%

Flexural strength: 760 kg/cm$^2$

The temperature indicating a melt flow index (MI-value) of 10 g/10 minutes, melt tension (MT-value) at the temperature, yellowness (YI-value) and evaluation on degradability are:

Temperature (MI: 10 g/10 min): 200° C.

Melt tension (MT-value): 1.6 g

Yellowness (YI-value): 10.0

Degradability: Film strength could not be measured due to degradation.

Example 9

To a 500 ml round bottomed flask, 103.9 g of 88% L-lactic acid and 0.2041 g of 1,2,3,4-cyclopentanetetracarboxylic acid were charged. After heat-dissolving 1,2,3,4-cyclopentanetetracarboxylic acid, 0.43 g of stannous oxide was added and heated with stirring at 140° C./100 mmHg for 3 hours while distilling water out of the reaction system. Thereafter, a Dean Stark trap which was charged with 73 g of o-dichlorobenzene was mounted on the flask and further 73.2 g of o-dichlorobenzene was added to the reaction mass and azeotropic dehydration was carried out at 140° C./270 mmHg for 4 hours. Successively, the Dean Stark trap was dismantled and a tube packed with 30 g of molecular sieve 3A and 54 g of o-dichlorobenzene having water content of 1 ppm or less was mounted so as to return the reflux-distilled organic solvent to the reaction system again after passing through the molecular sieve. The reaction was continued by heat-stirring at 140° C./270 mmHg for 5 hours which prevented the reaction system from contamination by water. When the molecular weight was attained to 21,000, 0.1505 g of 1,4-butanediol was added and further reacted at 140° C./270 mmHg for 33 hours.

After passing through the molecular sieve, the organic solvent had a water content of 2 ppm. The reaction mixture was cooled to 30° C., mixed with 800 ml of a 0.7% hydrochloric acid/isopropyl alcohol solution, stirred for an hour and suction filtered. The operation was carried out twice in order to remove the tin powder.

Successively, the filter cake was stirred in 600 ml of isopropyl alcohol and suction filtered. The procedure was repeated until the filtrate became neutral and the filter cake was dried at 60° C. in heat air. The degradable polymer thus obtained was 56.3 g. The yield was 77%. The degradable polymer had a weight average molecular weight of 272,000, and a glass transition temperature of 57.9° C. and melting point of 161.3° C. by differential thermal analysis.

A press film was prepared by hot-pressing the resulting degradable polymer at 180° C. The press film had following properties.

Thickness: 125–132 $\mu$m

Tensile strength: 600 kg/cm$^2$ (break)

Elongation: 6%

Haze: <1%

Flexural strength: 780 kg/cm$^2$

The temperature indicating a melt flow index (MI-value) of 10 g/10 minutes, melt tension (MT-value) at the temperature, yellowness (YI-value) and evaluation on degradability are:

Temperature (MI: 10 g/10 min): 203° C.

Melt tension (MT-value): 1.2 g

Yellowness (YI-value): 14.5

Degradability: Film strength could not be measured due to degradation.

Comparative Example 1

L-Polylactic acid having a weight average molecular weight of 143,000 had a glass transition temperature of 58.0° C. and melting point of 165.3° C. by differential thermal analysis.

A press film was prepared by hot-pressing the resulting degradable polymer at 180° C. The press film had following properties.

Thickness: 122–136 μm

Tensile strength: 570 kg/cm² (break)

Elongation: 7%

Haze: <1%

Flexural strength: 900 kg/cm²

The temperature indicating a melt flow index (MI-value) of 10 g/10 minutes, melt tension (MT-value) at the temperature, yellowness (YI-value) and evaluation on degradability are:

Temperature (MI: 10 g/10 min): 193° C.

Melt tension (MT-value): 0.6 g

Yellowness (YI-value): 2.5

Degradability: Film strength could not be measured due to degradation.

Comparative Example 2

To a 500 ml round bottomed flask, 103.2 g of 88% L-lactic acid, 0.1034 g of pentaerythritol and 0.43 g of stannous oxide were charged, and heated with stirring at 140° C./100 mmHg for 3 hours while distilling water out of the reaction system. Thereafter, a Dean Stark trap which was charged with 72 g of o-dichlorobenzene was mounted on the flask and further 72 g of o-dichlorobenzene was added to the reaction mass and azeotropic dehydration was carried out at 140° C./270 mmHg for 4 hours. Successively, the Dean Stark trap was dismantled and a tube packed with 30 g of molecular sieve 3A and 72 g of o-dichlorobenzene having water content of 10 ppm or less was mounted so as to return the reflux-distilled solvent to the reaction system again after passing through the molecular sieve. The reaction was continued by heat-stirring at 140° C./270 mmHg for 29 hours which preventing the reaction system from contamination of water.

After passing through the molecular sieve, the organic solvent had a water content of 2 ppm. The reaction mixture was cooled to 30° C., mixed with 800 ml of a 0.7% hydrochloric acid/isopropyl alcohol solution, stirred for an hour and suction filtered. The operation was carried out twice in order to remove the tin powder.

Successively, the filter cake was stirred in 600 ml of isopropyl alcohol and suction filtered. The procedure was repeated until the filtrate became neutral and the filter cake was dried at 60° C. in heat air. The degradable polymer thus obtained was 57.6 g. The yield was 79%. The degradable polymer had a weight average molecular weight of 131,000, and a glass transition temperature of 56.2° C. and melting point of 158.0° C. by differential thermal analysis.

A press film was prepared by hot-pressing the resulting degradable polymer at 180° C. The press film had following properties.

Thickness: 148–157 μm

Tensile strength: 510 kg/cm² (break)

Elongation: 5%

Haze: <1%

Flexural strength: 790 kg/cm²

The temperature indicating a melt flow index (MI-value) of 10 g/10 minutes, melt tension (MT-value) at the temperature, yellowness (YI-value) and evaluation on degradability are:

Temperature (MI: 10 g/10 min): 176° C.

Melt tension (MT-value): 0.6 g

Yellowness (YI-value): 2.5

Degradability: Film strength could not be measured due to degradation.

Comparative Example 3

To a 1000 ml round bottomed flask, 178.4 g of 90% L-lactic acid and 0.75 g of stannous oxide were charged and heated with stirring at 140° C./100 mmHg for 3 hours while distilling water out of the reaction system. Thereafter, a Dean Stark trap which was charged with 100 g of o-dichlorobenzene was mounted on the flask and further 128.4 g of o-dichlorobenzene was added to the reaction mass. Azeotropic dehydration was carried out at 140° C./270 mmHg for 8 hours. Molecular weight attained was 46,000. Successively, the Dean Stark trap was dismantled and a tube packed with 30 g of molecular sieve 3A and 78 g of o-dichlorobenzene having water content of 10 ppm or less was mounted so as to return the reflux-distilled solvent to the reaction system again after passing through the molecular sieve. Further, 1.30 g of ethylcellulose having an ethoxylation degree of 48% and molecular weight of 67,000 was added and reacted by heating with stirred at 140° C./270 mmHg for 16 hours which prevented the reaction system from contamination by water.

After passing through the molecular sieve, the organic solvent had a water content of 2 ppm. The reaction mixture was cooled to 30° C., mixed with 800 ml of a 0.7% hydrochloric acid/isopropyl alcohol solution, stirred for an hour and suction filtered. The operation was carried out twice in order to remove the tin powder.

Successively, the filter cake was stirred in 600 ml of isopropyl alcohol and suction filtered. The procedure was repeated until the filtrate became neutral and the filter cake was dried at 60° C. in heat air. The degradable polymer thus obtained was 107.7 g. The yield was 83%. The degradable polymer had a weight average molecular weight of 365,000, and a glass transition temperature of 57.9° C. and melting point of 161.3° C. by differential thermal analysis.

A press film was prepared by hot-pressing the resulting degradable polymer at 180° C. The press film had following properties.

Thickness: 115–122 μm

Tensile strength: 610 kg/cm² (break)

Elongation: 9%

Haze: <1%

Flexural strength: 800 kg/cm²

The temperature indicating a melt flow index (MI-value) of 10 g/10 minutes, melt tension (MT-value) at the temperature, yellowness (YI-value) and evaluation on degradability are:

Temperature (MI: 10 g/10 min): 194° C.

Melt tension (MT-value): 6.7 g

Yellowness (YI-value): 20.5

Degradability: Film strength could not be measured due to degradation.

What is claimed is:

1. A process for preparing a degradable polymer comprising reacting, by dehydration condensation in the presence of a catalyst, component (A): aliphatic hydroxycarboxylic acid, component (B): only one material selected from the group consisting of:

(b-1) polycarboxylic acid having three or more carboxyl groups and/or anhydride thereof, and (b-3) aliphatic polyhydric alcohol having three or more hydroxyl groups with the proviso that the aliphatic polyhydric alcohol having three or more hydroxyl groups is not a polysaccharide, and component (C): only one material which can conduct an esterification reaction with compound (B) and is selected from the group consisting of
- (c-1) polycarboxylic acid having two or more carboxyl groups and/or anhydride thereof, and
- (c-3) aliphatic polyhydric alcohol having two or more hydroxyl groups wherein the amount of component (B) corresponds to 0.005–10% by weight for the theoretical amount of the polymer resulting from complete hompolycondensation of component (A) and an equivalent ratio of component (B) to component (C) is 100:90–110.

2. The process for preparing a degradable polymer according to claim 1, wherein component (B) is (b-1) polycarboxylic acid having three or more carboxyl groups and/or anhydride there of and component (C) is (c-3) aliphatic polyhydric alcohol having two or more hydroxyl groups.

3. The process for preparing a degradable polymer according to claim 1, wherein component (B) is (b-3) aliphatic polyhydric alcohol having three or more hydroxyl groups and component (C) is (c-1) polycarboxylic acid having two or more carboxyl groups and/or anhydride thereof.

4. The process for preparing a degradable polymer according to claim 1, wherein (b-1) polycarboxylic acid having three or more carboxyl groups and/or anhydride thereof is a linear compound.

5. The process for preparing a degradable polymer according to claim 4, wherein (b-1) polycarboxylic acid having three or more carboxyl groups is butane-1,2,3,4-tetracarboxylic acid and/or anhydride thereof.

6. The process for preparing a degradable polymer according to claim 1, wherein (b-3) aliphatic polyhydric alcohol having three or more hydroxyl group is one or more compound selected from the group consisting of glycerol, pentaerythritol, dipentaerythritol, trimethylolethane, trimethylolpropane and inositol.

7. The process for preparing a degradable polymer according to claim 1, wherein the dehydration condensation is carried out in an organic solvent substantially in the absence of water.

8. The process for preparing a degradable polymer according to claim 7, wherein a portion or all of the organic solvent in the reaction system is removed and additional organic solvent having a water content less than or equal to the water content dissolved in the removed organic solvent is charged.

9. The process for preparing a degradable polymer according to claim 8, wherein the additional organic solvent has a water content of 50 ppm or less.

10. The process for preparing a degradable polymer according to claim 8, wherein the the removed organic solvent is treated by bringing the removed organic solvent into contact with a drying agent.

11. A process for preparing a degradable polymer comprising reacting, in the presence of a catalyst, only a), b) and c) wherein a) is a cyclic dimer and/or lactone of aliphatic hydroxycarboxylic acid, b) is an aliphatic polyhydric alcohol having three or more hydroxyl groups with the proviso that the aliphatic polyhydric alcohol is not a polysaccharide, and c) is a polycarboxylic acid having two or more carboxyl groups and/or anhydride of the same.

12. The process for preparing a degradable polymer according to claim 11, wherein an amount of aliphatic polyhydric alcohol having three or more hydroxyl group corresponds to 0.005–1% by weight for the theoretical amount of the polymer resulting from complete homopolymerization of cyclic dimer and/or lactone and an equivalent ratio of aliphatic polyhydric alcohol having three or more hydroxyl group to polycarboxylic acid having two or more carboxyl group and/or anhydride of the same is 100:90–110.

13. The degradable polymer obtained by the process according to claim 1.

14. The degradable polymer according to claim 13, which has a melt tension of 0.7 g or more at temperature indicating a melt-flow index of 10 g/10 minutes.

15. A foam, molded article, container, sheet or film comprising the degradable polymer according to claim 13.

16. A degradable polymer having a structure resulting from combination of a star-shaped polymer comprising only a polyfunctional base compound of polycarboxylic acid having three or more carboxyl groups and/or anhydride of the same and a unit of aliphatic hydroxycarboxylic acid, with aliphatic polyhydric alcohol having two or more hydroxyl groups with the proviso that the aliphatic polyhydric alcohol is not a polysaccharide.

17. A degradable polymer having a structure resulting from combination of a star-shaped polymer comprising only a polyfunctional base compound of polyhydric alcohol having three or more hydroxyl groups with the proviso that the aliphatic polyhydric alcohol is not a polysaccharide and a unit of aliphatic hydroxycarboxylic acid, with polycarboxylic acid having two or more carboxyl groups and/or anhydride of the same.

18. A process for preparing a degradable polymer comprising reacting by dehydrating condensation in the presence of a catalyst, L-lactic acid, pentacrythritol and succinic acid.

* * * * *

UNITED STATES PATENT AND TRADEMARK OFFICE
CERTIFICATE OF CORRECTION

PATENT NO. : 5,914,381
DATED : June 22, 1999
INVENTOR(S) : Yuji TERADO et al.

It is certified that error appears in the above-identified patent and that said Letters Patent is hereby corrected as shown below:

Column 28, line 49, replace "pentacrythritol" with --pentaerythritol--.

Signed and Sealed this

Eighth Day of May, 2001

*Attest:*

NICHOLAS P. GODICI

*Attesting Officer*  Acting Director of the United States Patent and Trademark Office